Oct. 3, 1967 R. C. BRACKETT 3,344,831

PALLET CONTAINER

Filed July 30, 1964 2 Sheets-Sheet 1

INVENTOR.
Ralph C. Brackett.
BY
Harness, Dickey & Pierce
ATTORNEYS.

Oct. 3, 1967 R. C. BRACKETT 3,344,831

PALLET CONTAINER

Filed July 30, 1964 2 Sheets-Sheet 2

INVENTOR.
Ralph C. Brackett.
BY
Harness, Dickey & Pierce
ATTORNEYS.

United States Patent Office 3,344,831
Patented Oct. 3, 1967

1

3,344,831
PALLET CONTAINER

Ralph C. Brackett, Fresno, Calif., assignor to Fruehauf Corporation, Detroit, Mich., a corporation of Michigan Filed July 30, 1964, Ser. No. 386,152
4 Claims. (Cl. 150—0.5)

This invention relates generally to shipping and storage containers, and particularly to a flat bed pallet that is convertible to a relatively large container.

Containers adapted for transporting and storing various liquids and granular substances, are required to satisfy a number of factors in order that the overall cost may be kept to a minimum. For example, the container weight should be kept to a minimum since the structural design for the carrier which handles the container is determined accordingly.

Additionally, the container must protect the substance being shipped. In shipping perishable goods such as foods, the container must be capable of preventing spoilage and must be of a substance which will not deteriorate in the presence of the food. Also, as with some foods, refrigeration might be required and the container must be of a design to withstand extreme temperatures. In transporting dangerous liquids such as flammable fuels, the container must of necessity be fireproof.

Conventionally, liquids and granular substances are transported by trailer trucks or railroad cars having a relatively large metal tank fixed thereto. The tank is filled with the liquid or grain and shipped to the distributor or consumer where it is transferred to another tank for storage or dispensing. Several problems arise in this mode of operation. Initially, the metal tanks used in shipping are by nature relatively large and heavy and require heavy structural carriers for transporting. Also, the metal containers generally require venting to compensate for heat expansion of the substance being shipped. Permitting exposure to air accelerates spoilage of food items and allows dangerous fumes to escape from flammable liquids.

In handling time and costs, the conventional metal tanks require transferring the contents from the transporting tanks to the destination storage tanks, often a lengthy process. Additionally, the return trip with the empty tanks involves transportation expense with no profit for the shipper or with increased costs to the consumer.

The present invention is directed to a relatively light shipping and storage container adapted to overcome the aforementioned difficulties. Briefly, the present invention includes a collapsible container adapted to be supported on or attached to a carrier vehicle through a portable base frame and which is expandable automatically upon reception of a liquid or grain to be shipped. The container walls are preferably constructed from a durable foldable material possessing the necessary physical properties to insure safe handling of the particular substance and are suitably attached to the base frame along with a pair of frame doors. The container is sufficiently flexible to allow expansion or contraction without venting which reduces or eliminates spoilage and fume leakage. Also, the doors are movable to permit free container expansion but will enclose and protect the container upon contraction or collapse thereof. The collapsed device facilitates easy storage because of its reduced height, which may only be 20% of the expanded height, and is usable as a pallet in the collapsed position. Additionally, the portability of the frame and container assembly obviates unloading the container contents at the delivery destination. With this invention, the shipper may leave the entire container assembly at the destination while picking

2 up other collapsed empty containers which can serve as pallets for the return trip.

An object, therefore, of the present invention is an improved shipping pallet container convertible from a pallet to an expanded protective container.

A further object of the present invention is an improved pallet container of the above type expandable upon filling with the substance to be shipped and collapsible upon unloading thereof.

A further object of the present invention is an improved flexible pallet container of the above character adapted for storing and shipping a variety of perishable and flammable items.

A further object of the present invention is an improved pallet container of the above character which is completely portable and which can be attached directly to a carrier vehicle.

A further object of the present invention is an improved pallet container of the above type completely automatic in its convertibility.

A further object of the present invention is an improved pallet container of the above character which is relatively inexpensive to manufacture, durable in construction and which is reliable in use and facilitates easy handling.

Further objects and advantages of the present invention will become more apparent from a consideration of the following detailed description taken in conjunction with the drawings in which.

Figure 3:
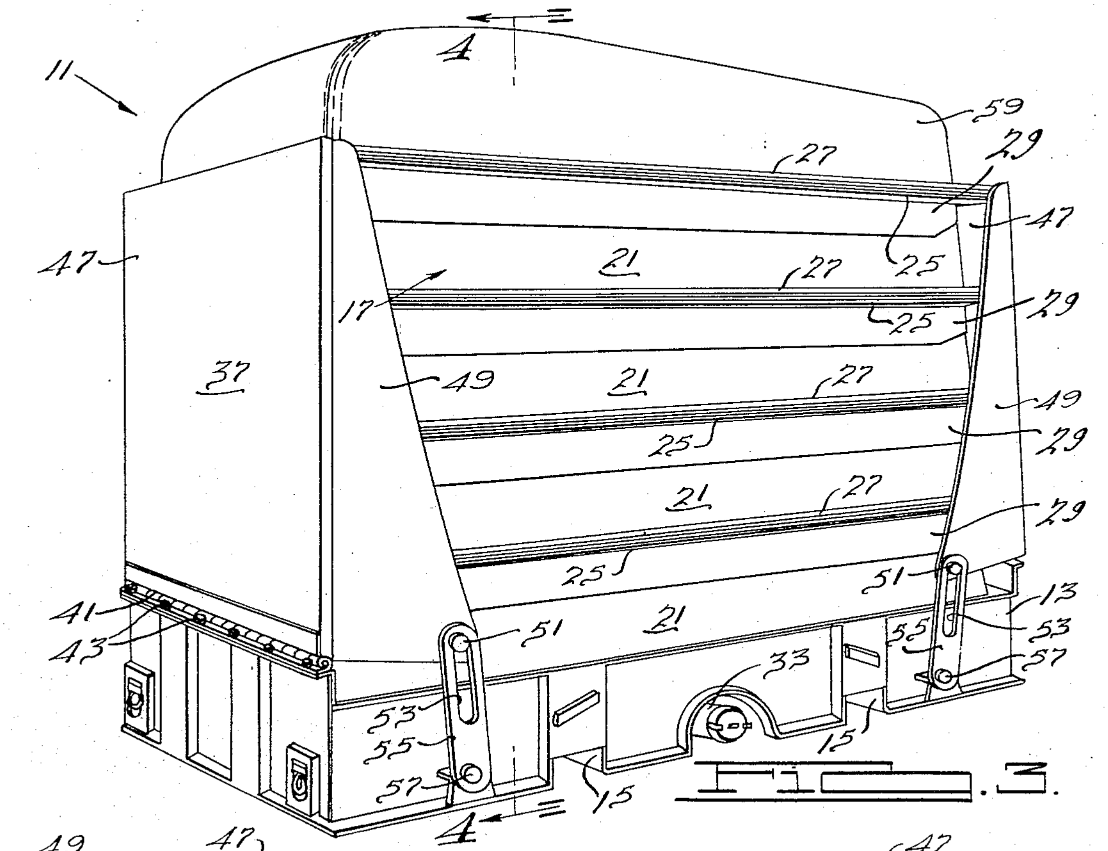
FIG. 3 is a perspective view of the device of FIG. 1 showing the container in its expanded condition.
Figure 1:
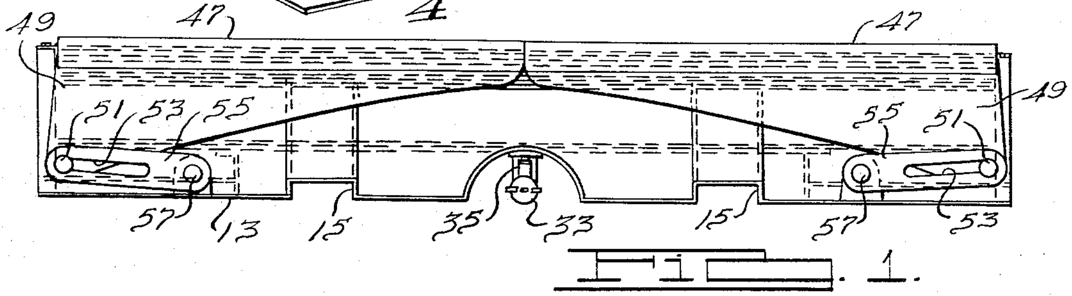
FIGURE 1 is an elevational view of a pallet container constructed according to the principles of the present invention and shown in the collapsed condition.
Figure 2:
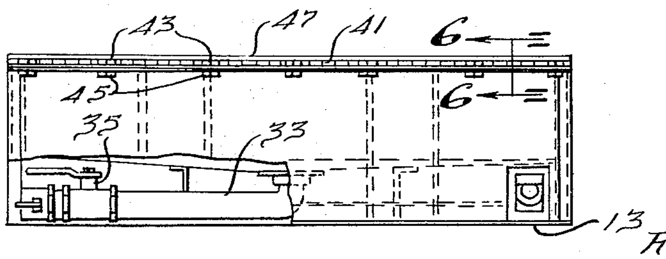
FIG. 2 is an end view of the structure of FIG. 1 partially broken away for clarity.

Referring now more specifically to the drawings, and particularly to FIGS. 1–3, a pallet container 11, embodying the principles of the present invention, includes a base frame 13 adapted to be supported upon or attached to a conventional semitrailer or rail car by suitable means (not shown). The base frame 13 is constructed from a suitable rigid material such as relatively light aluminum extrusions and stampings to minimize the weight of the device. Additionally, the base 13 may be provided with transversely extending spaced slots 15 along the bottom edge to facilitate handling by a conventional fork-lift.

A container, indicated generally at 17 in FIG. 3, has a bottom portion sealingly connected to a wall 19 of the base frame 13 and is formed from a suitably durable and flexible material such as a rubberized canvas, vinyl or other suitable material possessing the necessary physical properties to protect against deterioration or spoilage of or even attack by the substance carried within. Containers constructed from the highly versatile and durable urethane have been found to be highly effective in very critical areas.

Figure 4:
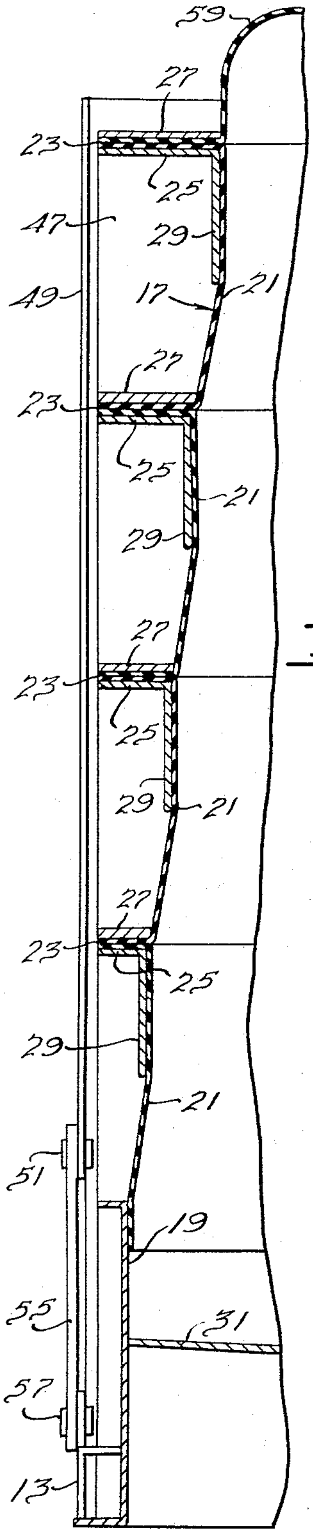
FIG. 4 is an enlarged fragmentary sectional view of the structure of FIG. 3 taken along the line 4—4 thereof.
Figure 6:
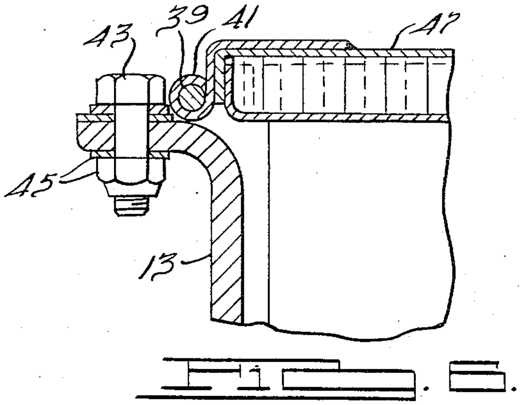
FIG. 6 is an enlarged fragmentary sectional view of the structure of FIG. 2 taken along the line 6—6 thereof.

As shown, the container 17 may consist of a plurality of separate sections 21 having adjacent superimposed edge portions 23 sealingly clamped as by pairs of guide and lock frame members 25 and 27 joined together in any suitable fashion. Alternatively, the container 17 may be integrally formed of one piece with the frame members 25 and 27 clamped to vertically spaced container folds 23. Each of the guide and lock frames 25 and 27 may extend circumferentially around the container 17 which, in this instance, is generally rectangular in cross-section. Additionally, each guide frame 25 has a downwardly depending portion 29 adapted to be freely receivable within and guided by the adjacent lower lock frame member 25. Thus, when the container is allowed to collapse from the position shown in FIGS. 3 and 4, these depending portions will telescope into the adjacent depending portion below causing the container wall portion to fold therearound. See FIG. 5.

The base 13 is provided with a lower wall 31 sealingly joined at its periphery to the wall 19 forming the bottom of the container 17. A suitable feeder pipe 33 is fixed at one end to the lower wall 31 adjacent an inlet opening therein and has its other end positioned adjacent the side edge of the base 13 for attachment to a supply hose. A conventional valve 35 is adapted to open and close the pipe 33 as desired.

Figure 5:
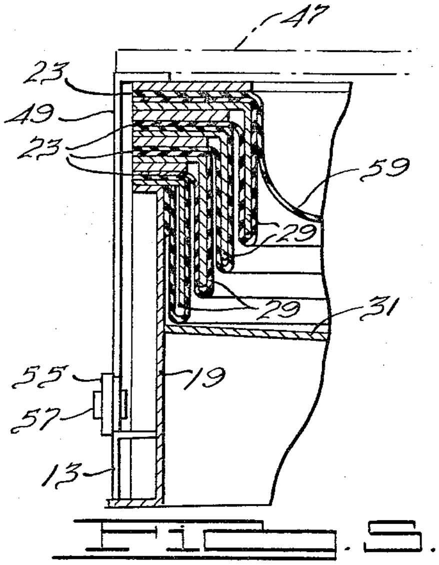
FIG. 5 is a view similar to FIG. 4 showing the container in its collapsed position.

In use, the container 17, normally in the collapsed position illustrated in FIGS. 1, 2 and 5, is gradually expanded under the pressure of the fluid or grain to be shipped as it is pumped through a suitable hose (not shown) connected to the feeder pipe 33. When the container 17 is full, it is in the position illustrated in FIGS. 3 and 4 after which the valve 35 is closed. When it is desired to empty the container 17, the pumping process is reversed or the valve simply opened with the liquid or grain being dispensed under its own pressure. As the container 17 is emptied, it will gradually collapse with the guide frame depending portions 29 cooperating with the lock frames 27 to insure proper folding of the container wall. Thus, one may readily determine the quantity of substance within the container simply by observing the container height.

The device of the present invention is designed to serve equally as a pallet as well as a storage container. Thus, an identical pair of doors 37 are pivotally mounted, one at each end of the base 13, by a conventional pivot pin 39 and hinge assembly 41 fixed to the base 13 as by bolts 43 and nuts 45. These doors 37 may be of a variety of confiugrations but in the device illustrated, preferably have a straight wall portion 47 adapted to overlie the top of the base 13. The straight wall portions 47 may each be of a length substantially equal to one-half the length of the base 13 to completely cover the base 13 when in the position shown in FIG. 1. Each of the doors 37 may additionally have a pair of side wall portions 49 extending along each side edge of the straight wall portion 47 and generally perpendicular thereto.

To limit the upward pivotal movement of the doors 37, each of the side wall portions 49 may have a pin 51 fixed thereto adapted to slide within a slot 53 formed in an arm 55. A pivot pin 57 mounts each of the arms 55 to the frame 13. Thus, pivotal movement of the doors 37 is limited to movement from a position overlying the base 13 when the container 17 is collapsed to a position at an acute angle to the vertical when the container is fully expanded, as shown in FIG. 3.

When the container 17 is empty and collapsed, the door straight wall portions 47 form a substantially continuous top supporting surface thereby rendering the device useful as a conventional pallet. The doors 37 are, however, automatically pivoted to the position illustrated in FIGS. 3 and 4 upon expansion of the container 17. Thus, as the container expands and the guide and lock frames 25 and 27 move gradually upwardly, the outer edge portions thereof engage the doors 37 and gradually pivot them upwardly about the pivot pins 39. In the device illustrated, the frames 25 and 27 are generally rectangular and the walls 47 and 49 of the doors 37 are generally at right angles to each other. However, it is to be understood that any suitable configuration may be used here. Also, as pointed out hereinabove, the doors 37 pivot only to a point at an acute angle to the vertical. The frames 25 and 27 are designed of a length to accommodate this positioning of the doors 37. Thus, as the container 17 collapses and the frames 25 and 27 move downwardly, the doors 37 will pivot downwardly under their own weight since their center of gravity is always inwardly of the edge of the base 13.

In use, when the liquid or grain first enters the container 17 under pressure, a crown portion 59 will be expanded upwardly before the frames 25 and 27 begin upward movement. This will initiate pivotal movement of the doors 37 with the frames 25 and 27 thereafter taking over. Conversely, when the container 17 collapses, the crown portion 59 is withdrawn inwardly so as to permit door closure. This will occur under the weight of the container crown; however, if the liquid or grain is removed from the container by pumping, the container crown 59 will be withdrawn inwardly thereby.

The device of the present invention is designed for shipping and storing a variety of substances. For example, the substance shipped may be refrigerated, the device may be designed to ship various fuels and other flammable substances, or virtually any liquid or grain may be shipped and stored therein. Additionally, when the shipment arrives at its destination, the container may be emptied into a suitable tank or the entire pallet may be unloaded as by a fork-lift and allowed to remain until the contents are distributed at the destination. In either event, the empty container may serve as a shipping pallet on the return trip and the portability thereof facilitates easy handling.

The base 13 may be designed to be easily attached to the bed of a suitable semitrailer, rail car, or other suitable carrier. Conversely, it is possible to design the base 13 as an integral part of a semitrailer frame with the base serving as the trailer bed. However, the particular design will vary as do the particular needs.

While a preferred embodiment of the present invention has been illustrated and described above, various additions, substitutions, modifications may be made thereto without departing from the spirit of the invention as encompassed by the appended claims.

What is claimed is:

1. A pallet container comprising
a base,
a flexible collapsible container disposed upon said base and having a lower portion connected thereto.
means providing a sealable inlet opening to said container adjacent the lower end portion thereof for the reception and delivery of a fluid substance,
at least one door pivotally attached to said base for movement from a position substantially overlying said base to a position generally vertically thereof,
and a plurality of vertically spaced frames surrounding said container and each having an outer portion engageable with said door,
whereby insertion of a fluid substance within said container will expand said container vertically with said frames engaging and pivoting said door to its generally vertical position and delivery of said substance from said container will permit said container to collapse and said door to move to its base-overlying position.

2. A pallet container comprising
a generally flat base,
a flexible collapsible container disposed upon said base and having a lower end portion sealingly connected thereto,
means providing a sealable inlet opening in said base adjacent and within the lower end portion of said container for the reception and delivery of a pressurized substance,
an opposed pair of doors pivotally attached to said base at either end thereof for movement from a position substantially overlying said base to a position at an acute angle to the vertical, and a plurality of vertically spaced frames surrounding said container and each having an outer portion engageable with each said door, whereby insertion of a pressurized substance within said container will expand said container vertically with said frames engaging and pivoting said doors to their generally vertical position and delivery of said substance from said container will permit said container to collapse and said doors to move to their base-overlying position.

3. A pallet container comprising a generally flat base, a flexible collapsible container disposed upon said base and having a lower end portion sealingly connected thereto, means providing a sealable inlet opening in said base adjacent and within the lower end portion of said container for the reception and delivery of a pressurized substance, at least one door pivotally attached to said base for movement from a position substantially overlying said base to a position generally vertically thereof, and a plurality of vertically spaced frames surrounding said container and each having an outer portion engageable with said door and a depending portion receivable within an adjacent one of said frames when said container is moved toward its collapsed position, whereby insertion of a pressurized substance within said container will expand said container vertically with said frames engaging and pivoting said door to its generally vertical position and delivery of said substance from said container will permit said container to collapse and said door to move to its base overlying position.

4. A pallet container comprising a generally flat portable base adapted for connection to a carrier vehicle, a flexible collapsible container disposed upon said base and having a lower end portion sealingly connected thereto, means providing a sealable inlet opening in said base adjacent and within the lower end portion of said container for the reception and delivery of a pressurized substance, at least one door pivotally attached to said base for movement from a generally horizontal position substantially overlying said base to a position generally vertically thereof, and a plurality of vertically spaced frames surrounding said container and each having an outer portion engageable with said door, insertion of a pressurized substance within said container expanding said container vertically and delivery of said substance from said container permitting said container to collapse and said door to move to its base overlying position, said door in conjunction with said base completely enclosing and protecting said container in the collapsed condition.

References Cited

UNITED STATES PATENTS 2,931,409 4/1960 Unthank ----------- 150—0.5

THERON E. CONDON, *Primary Examiner.*

JAMES B. MARBERT, *Examiner.*